(12) United States Patent
Itoh

(10) Patent No.: US 6,972,045 B2
(45) Date of Patent: Dec. 6, 2005

(54) SUBSTRATE USED FOR EXHAUST GAS PURIFICATION AND METHOD OF FABRICATION THEREOF

(75) Inventor: Kazuhiro Itoh, Mishima (JP)

(73) Assignee: Toyota Jidosha Kabushiki Kaisha, Toyota (JP)

(\*) Notice: Subject to any disclaimer, the term of this patent is extended or adjusted under 35 U.S.C. 154(b) by 256 days.

(21) Appl. No.: 10/656,205

(22) Filed: Sep. 8, 2003

(65) Prior Publication Data

US 2004/0055264 A1    Mar. 25, 2004

(30) Foreign Application Priority Data

Sep. 25, 2002  (JP) .............................. 2002-279517

(51) Int. Cl.[7] .......................... B01D 46/00; F01N 3/022
(52) U.S. Cl. .................. 55/523; 55/385.3; 55/DIG. 5; 55/DIG. 30; 60/311; 264/628; 264/630; 264/638; 264/177.12; 264/209.3; 264/210.1; 264/210.3; 264/DIG. 48
(58) Field of Search .............................. 55/385.3, 523, 55/DIG. 5, DIG. 30; 60/274, 299, 301, 311; 428/116, 117, 118; 502/439; 264/628, 630, 264/638, 639, 177.12, 209.3, 209.4, 210.1, 264/210.2, 210.3, 210.4, DIG. 48

(56) References Cited

U.S. PATENT DOCUMENTS

| | | | |
|---|---|---|---|
| 4,695,301 A | * | 9/1987 | Okajima et al. ............... 55/523 |
| 6,863,705 B2 | * | 3/2005 | Ishihara et al. ............... 55/523 |
| 6,898,930 B2 | * | 5/2005 | Nakatani et al. ............... 60/311 |
| 2003/0230080 A1 | * | 12/2003 | Nakatani et al. ............... 60/311 |
| 2004/0172929 A1 | * | 9/2004 | Itoh et al. ...................... 55/523 |
| 2004/0206062 A1 | * | 10/2004 | Ichikawa ...................... 55/523 |
| 2004/0244343 A1 | * | 12/2004 | Nakatani et al. ............... 55/523 |

FOREIGN PATENT DOCUMENTS

| | | | | |
|---|---|---|---|---|
| FR | 2 841 151 | * | 12/2003 | .......... B01D 46/24 |
| JP | A 8-508199 | | 9/1996 | |
| JP | 2004-324575 | * | 11/2004 | .......... B01D 46/00 |
| WO | WO 94/22556 | * | 10/1994 | .......... B01D 46/10 |
| WO | WO 03/014545 | | 2/2003 | |

OTHER PUBLICATIONS

U.S. Appl. No. 10/333,414, filed on Jan. 21, 2003, Nakatani.

\* cited by examiner

*Primary Examiner*—Duane Smith
*Assistant Examiner*—Jason M. Greene
(74) *Attorney, Agent, or Firm*—Oliff & Berridge PLC

(57) ABSTRACT

A method of fabricating a substrate used for purifying an exhaust gas is provided. This method comprises the step of transforming a pre-mold having a first end, a second end, a plurality of partition walls extending between the first end and the second end, the first transforming step for transforming the end portions of the partition walls at the first end in such a manner that the ends of the partition walls defining one of two adjacent passages at the first end of the pre-mold are collected toward the center of a corresponding passage and connected to each other, and the second transforming step for transforming the ends of the partition walls at the first end in such a manner that the end surfaces of the partition walls at the first end are depressed toward the center of each of the end surfaces.

17 Claims, 8 Drawing Sheets

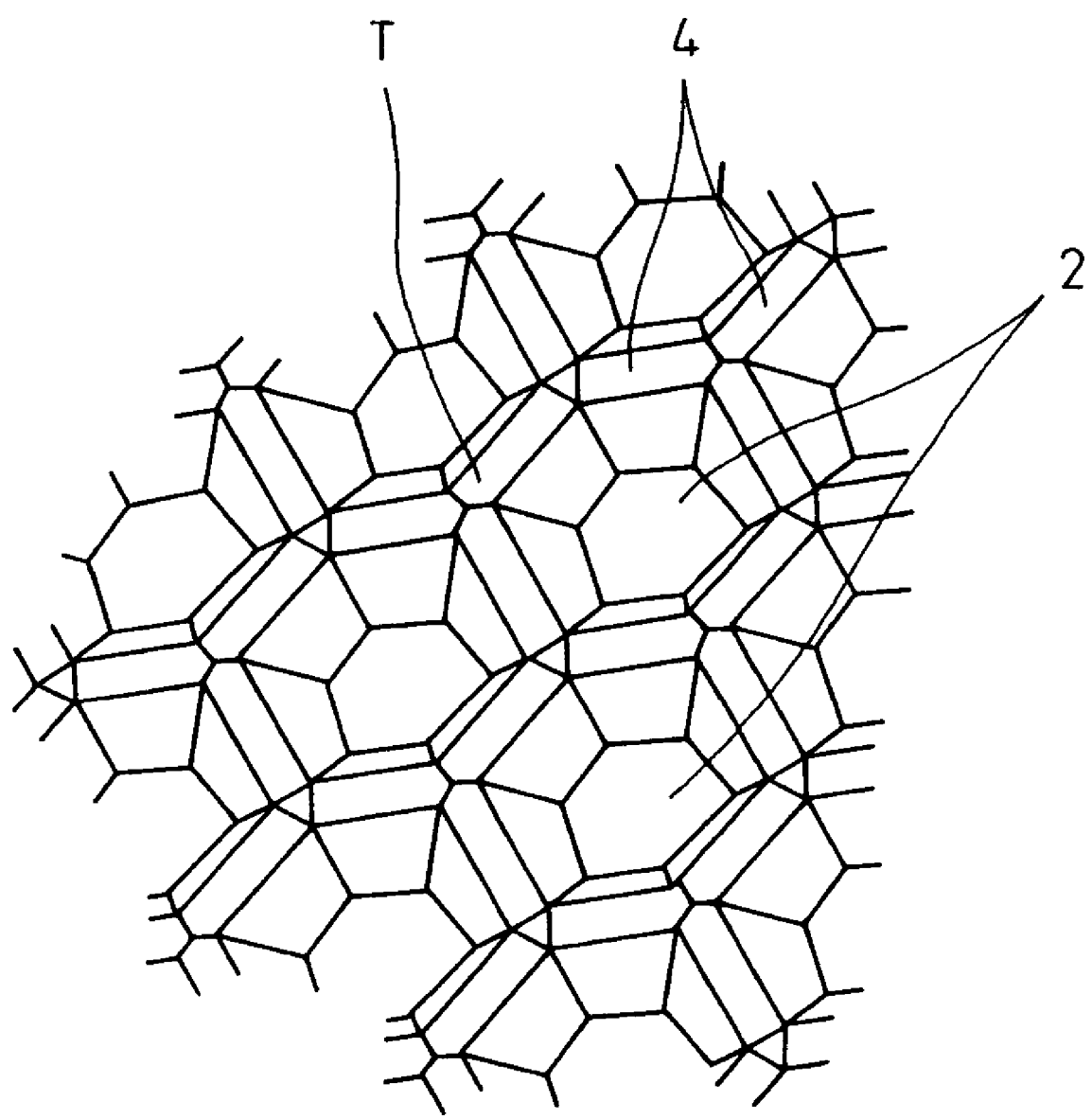

SUBSTRATE USED FOR EXHAUST GAS PURIFICATION AND METHOD OF FABRICATION THEREOF

BACKGROUND OF THE INVENTION

1. Field of the Invention

The present invention relates to a substrate used for purifying exhaust gas and a method of fabricating the substrate.

2. Description of the Related Art

A particulate filter for trapping fine particles in the exhaust gas emitted from the combustion chamber of the internal combustion engine is disclosed in Japanese Unexamined Patent Publication No. 8-508199. This filter has a plurality of passages defined by a plurality of partition walls of a porous material and extending in parallel with each other. One end opening of one of each adjacent two passages is closed, while the other end opening of the other of the adjacent two passages is closed. The exhaust gas that has flowed into a passage of the filter, therefore, flows into adjacent passages through the fine holes of the partition walls.

In the filter described in the publication cited above, the selected openings of the passages are closed by transforming and connecting the end portions of the partition walls into the form of a rectangular pyramid. In closing the end openings of the passages of this filter, a honeycombed structure of a porous material and a jig having a plurality of protrusions are prepared, and the jig is pressed against the end surface of the honeycombed structure so that the protrusions alternately enter the passages of the honeycombed structure.

In the case where the jig is pressed against the end surface of the honeycombed structure to close the openings of the passages by transforming the partition wall ends as described above, however, the partition wall ends may not be sufficiently connected and the openings of the passages may not be closed up completely. The object of this invention is to positively close up the passage openings of a substrate for purifying the exhaust gas.

SUMMARY OF THE INVENTION

In order to solve the problem described above, according to a first aspect of the invention, there is provided a method of fabricating a substrate used for purifying the exhaust gas, comprising:

the step of forming a pre-mold including a first end, a second end, a plurality of partition walls extending between the first end and the second end, and a plurality of passages defined by the plurality of the partition walls;

the first transforming step for transforming the ends of the partition walls, at the first end of the pre-mold, defining one of each two adjacent passages in such a manner that the ends of the partition walls are collected toward the center of the corresponding passage and connected to each other; and the second transforming step for transforming the ends of the partition walls, at the first end of the pre-mold, in such a manner that the end surface of each of the partition walls at said first end of said pre-mold is depressed toward the center of the end surface.

According to a second aspect of the invention, there is provided a method, in the first aspect of the invention, wherein the first transforming step and the second transforming step are executed at the same time.

According to a third aspect of the invention, there is provided a method, in the first aspect of the invention, wherein the second transforming step is executed after the first transforming step.

According to a fourth aspect of the invention, there is provided a method in the first aspect of the invention, wherein the amount of transformation of the partition wall ends in the first transforming step is smaller than the minimum amount required to close up a corresponding passage with the same partition wall ends, and the amount of transformation of the partition wall ends in the second transforming step is equal to the difference between the aforementioned minimum required amount and the transformation amount of the partition wall ends in the first transforming step.

According to a fifth aspect of the invention, there is provided a method, in the first aspect of the invention, wherein the amount of transformation of the partition wall ends in the first transforming step is smaller than the minimum amount required to close up a corresponding passage with the same partition wall ends, and the amount of transformation of the partition wall ends in the second transforming step is larger than the difference between the aforementioned required minimum amount and the transformation amount of the partition wall ends in the first transforming step.

According to a sixth aspect of the invention, there is provided a method, in the first aspect of the invention, wherein the cross section of the passages is a square and the partition wall ends closing the corresponding passages each form a portion in the shape of a substantially regular rectangular pyramid.

According to a seventh aspect of the invention, there is provided a method in the first aspect of the invention, wherein the cross section of the passages is a regular triangle and the partition wall ends closing the corresponding passages each form a portion in the shape of a substantially regular hexagonal pyramid.

According to an eighth aspect of the invention, there is provided a method, in the first aspect of the invention, wherein the pre-mold is formed of a porous material.

According to a ninth aspect of the invention, there is provided a method, in the first aspect of the invention, further comprising the third transforming step for transforming the partition wall ends at the second end of the pre-mold defining the other of the two adjacent passages in such a manner that the partition wall ends are collected toward the center of the corresponding passage and connected to each other, and the fourth transforming step for transforming the partition wall ends at the second end of the pre-mold in such a manner that the end surfaces of the partition walls at the second end of the pre-mold are depressed toward the center of the end surface.

According to a tenth aspect of the invention, there is provided a method, in the ninth aspect of the invention, wherein the first transforming step and the second transforming step are executed at the same time, and the third transforming step and the fourth transforming step are executed at the same time.

According to an 11th aspect of the invention, there is provided a method, in the ninth aspect of the invention, wherein the second transforming step is executed after the first transforming step, and the fourth transforming step is executed after the third transforming step.

According to a 12th aspect of the invention, there is provided a method in the ninth aspect of the invention, wherein the amount of transformation of the partition wall ends in the first transforming step is smaller than the minimum amount required to close up the passages with the partition wall ends, the amount of transformation of the partition wall ends in the second transforming step is equal to the difference between the required minimum amount and the transformation amount of the partition wall ends in the first transforming step, the amount of transformation of the partition wall ends in the third transforming step is smaller than the minimum amount required to close up the passages with the partition wall ends, and the amount of transformation of the partition wall ends in the fourth transforming step is equal to the difference between the required minimum amount and the transformation amount of the partition wall ends in the third transforming step.

According to a 13th aspect of the invention, there is provided a method in the ninth aspect of the invention, wherein the amount of transformation of the partition wall ends in the first transforming step is smaller than the minimum amount required to close up the passages with the partition wall ends, the amount of transformation of the partition wall ends in the second transforming step is larger than the difference between the required minimum amount and the transformation amount of the partition wall ends in the first transforming step, the amount of transformation of the partition wall ends in the third transforming step is smaller than the minimum amount required to close up the passages with the partition wall ends, and the amount of transformation of the partition wall ends in the fourth transforming step is larger than the difference between the required minimum amount and the transformation amount of the partition wall ends in the third transforming step.

Further, in order to solve the problem described above, according to a 14th aspect of the invention, there is provided a substrate used for purifying the exhaust gas, comprising a first end, a second end, a plurality of partition walls extending between the first end and the second end, and a plurality of passages defined by the plurality of the partition walls, wherein the ends of a plurality of the partition walls at the first end of the substrate defining one of each two adjacent passages are collected toward the center of a corresponding passage and connected with each other, the end surface of the partition wall ends at the first end of the substrate being depressed toward the center of the end surface, and wherein the ends of a plurality of the partition walls at the second end of the substrate defining the remaining one of the two adjacent passages are collected toward the center of the corresponding passage and connected with each other, the end surface of the partition walls at the second end of the substrate being depressed toward the center of the end surface.

According to a 15th aspect of the invention, there is provided a substrate, in the 14th aspect of the invention, wherein the cross section of the passages is a square in shape and the partition wall ends closing the corresponding passages form a portion substantially in the shape of a regular rectangular pyramid.

According to a 16th aspect of the invention, there is provided a substrate in the 14th aspect of the invention, wherein the cross section of the passages is a regular triangle in shape and the partition wall ends closing the corresponding passages form a portion substantially in the shape of a regular hexagonal pyramid.

According to a 17th aspect of the invention, there is provided a substrate in the 14th aspect of the invention, wherein the substrate is formed of a porous material.

BRIEF DESCRIPTION OF THE DRAWINGS

The present invention may be more fully understood from the description of the preferred embodiments of the invention set forth below together with the accompanying drawings, in which:

FIG. 10 is a diagram showing an end surface of the substrate according to another embodiment.

DESCRIPTION OF THE PREFERRED EMBODIMENTS

Figure 1A:
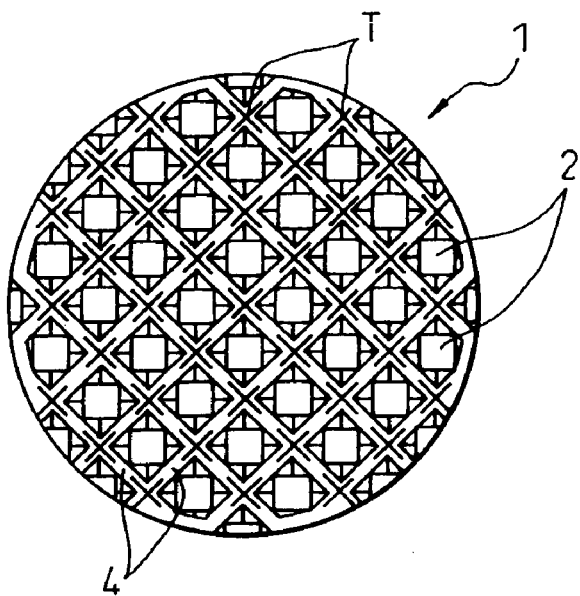
FIG. 1A is a diagram showing an end surface of a substrate according to this invention.
Figure 1B:
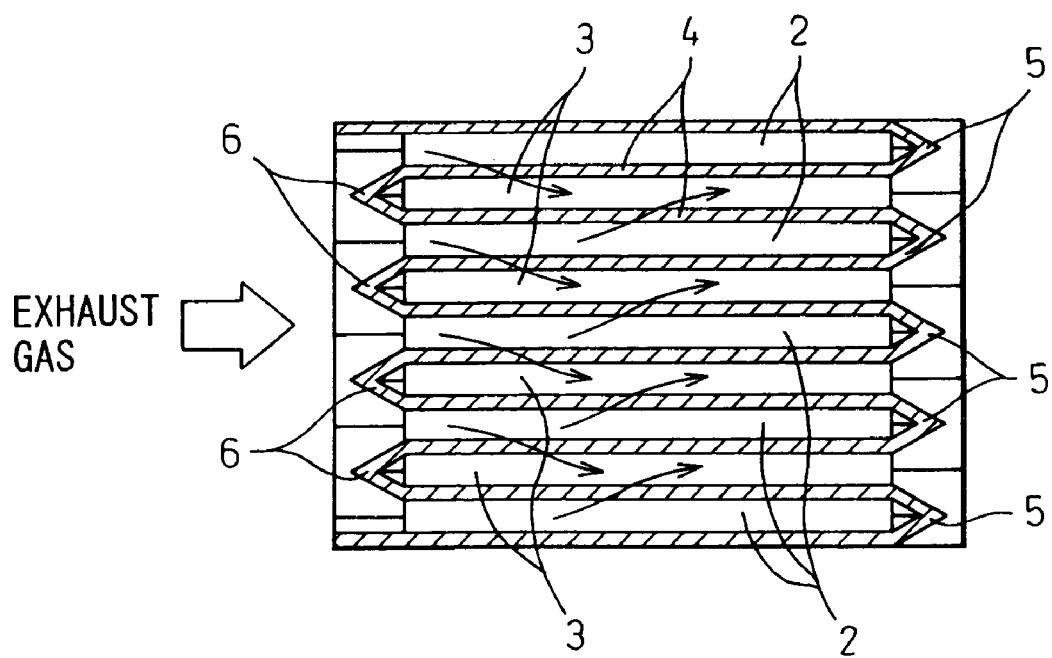
FIG. 1B is a longitudinal sectional view of the substrate according to the invention shown in FIG. 1A.

This invention will be explained with reference to the drawings. FIG. 1A shows an end surface of a substrate according to a first embodiment, and FIG. 1B is a longitudinal sectional view of the substrate shown in FIG. 1A. The substrate 1 has a honeycombed structure having a plurality of passages 2, 3 extending in parallel with each other. Each passage 2, 3 is defined by a plurality of (four in the first embodiment) partition walls 4. The substrate 1, i.e. the partition walls 4 are formed of a porous material. The substrate 1 is arranged in an exhaust gas passage of the internal combustion engine, for example, and used to trap the fine particles in the exhaust gas emitted from the combustion chamber of the internal combustion engine. The substrate 1 can of course be used as a carrier to carry a catalyst for purifying a specified component of the exhaust gas emitted from the combustion chamber of the internal combustion engine.

In the substrate 1, the passages 2, 3 are closed up by substantially regular rectangular pyramidal walls 5, 6 at alternate ends. Specifically, two adjacent passages 2, 3 of the substrate 1 are closed up by the substantially regular rectangular pyramidal walls 5, 6 at different ends. The exhaust gas entering the substrate 1, therefore, flows into the passages 2 and further into the adjacent passages 3 through the partition walls 4 as indicated by arrow in FIG. 1B.

Figure 2:
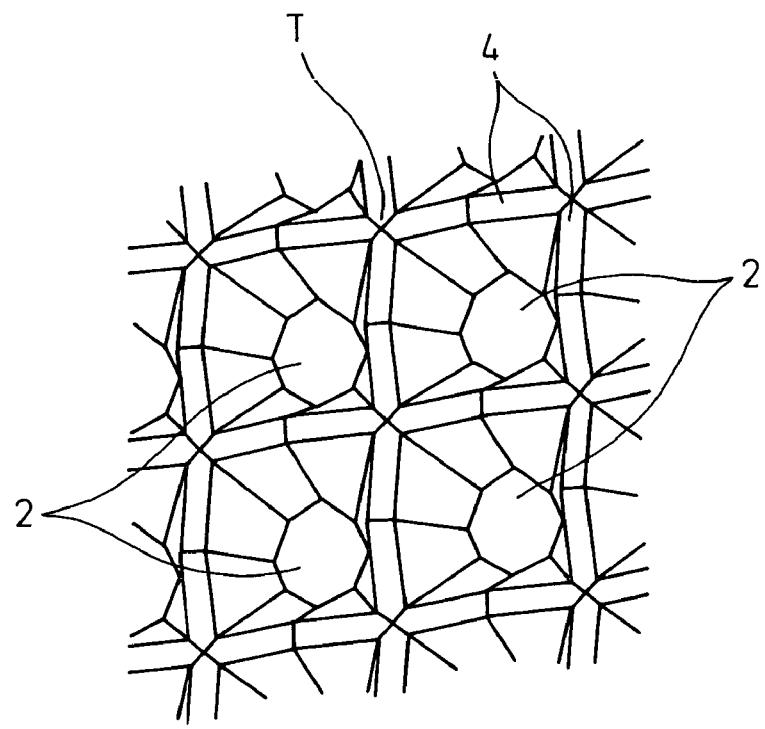
FIG. 2 is a perspective view showing a part of the end surface of the substrate.
Figure 3:
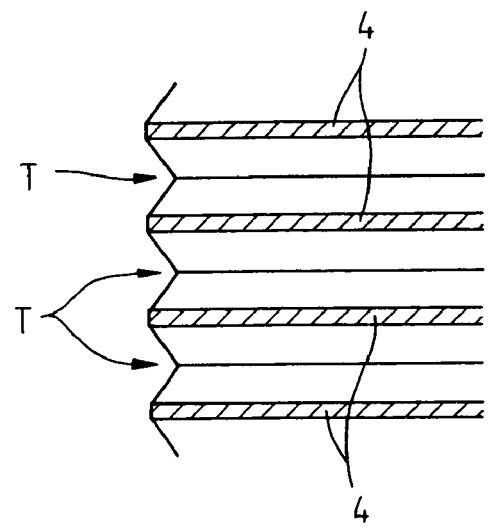
FIG. 3 is a sectional view along the end surface of the partition walls of the substrate.

The substantially regular rectangular pyramidal walls 5, 6 closing up the passages 2, 3 are each formed by being connected to each other collectively into a depression toward the center (i.e. the center axis of the passages 2, 3) at the ends of the four partition walls 4 defining the passages 2, 3. Specifically, as shown in FIG. 2, the substantially regular rectangular pyramidal walls 5, 6 are formed by being connected to each other into a depression collectively at the end surfaces of the partition walls 4 toward the top T. As shown in FIG. 2, therefore, the strip-shaped wall surfaces defined by the end surfaces of the partition walls 4 extend in the shape of a grid and cross each other to form a depression. Therefore, the end surface defined by the end surfaces of the partition walls 4 of the substrate 1, as shown in the sectional view of FIG. 3, has a convexo-concave shape with a bottom located at a tip T of the substantially regular rectangular pyramidal walls 5, 6 of the substrate 1 and a crest between the tips T.

Figure 4:
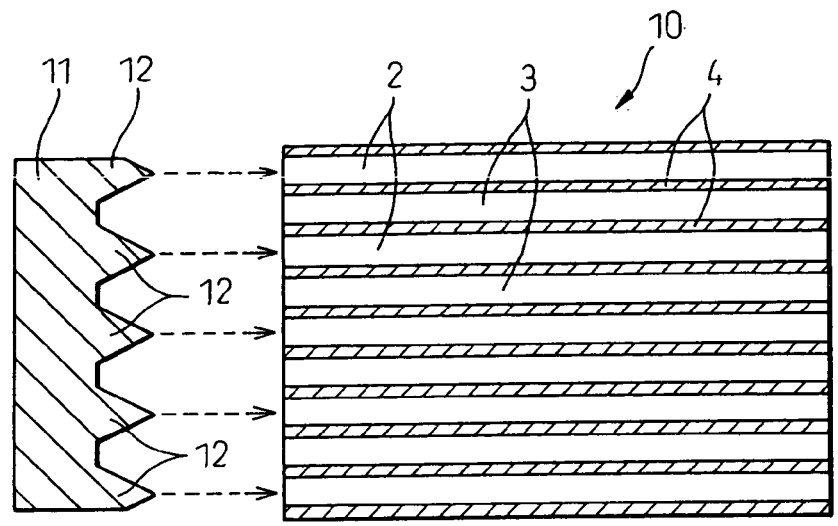
FIG. 4 is a diagram for explaining a method of fabricating a substrate according to the invention.

Next, a method of fabricating a substrate according to the invention will be explained. In the method of fabricating a substrate according to the invention, a pre-mold 10 having a honeycombed structure of a porous material such as cordierite or silicon nitride is formed first as shown in FIG. 4. The pre-mold 10 has a plurality of passages 2, 3 defined by a plurality of partition walls 4 and extending in parallel with each other. The passages 2, 3 have a square cross section.

Figure 5:
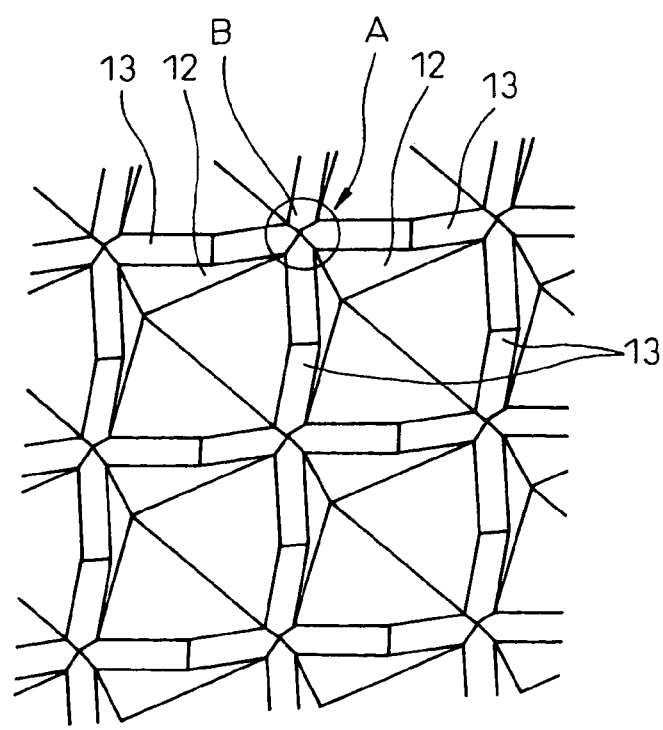
FIG. 5 is a perspective view showing a jig used in a method of fabricating a substrate according to the invention.

As shown in FIG. 4, a jig 11 is pressed against the end surface of the pre-mold 10. The jig 11 has a plurality of protrusions 12 as shown in FIGS. 4 and 5. The protrusions 12 each have the shape of a substantially regular rectangular pyramid and are aligned at predetermined intervals. Therefore, strip-shaped wall surfaces 13 extend between the protrusions 12. These strip-shaped wall surfaces 13 are concentrated at a corresponding area A where the bottom corners of the four adjacent protrusions 12 join each other. The strip-shaped wall surfaces 13 are assembled forming a hill toward a corresponding concentrated portion B.

Figure 6A:
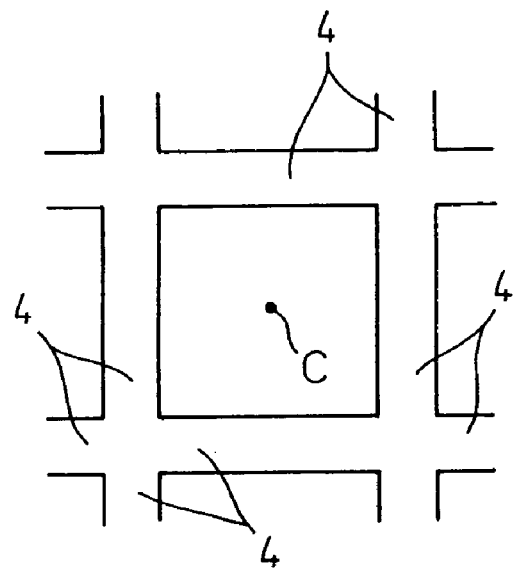
FIG. 6A is a diagram showing the partition walls of the substrate not yet transformed.
Figure 6B:
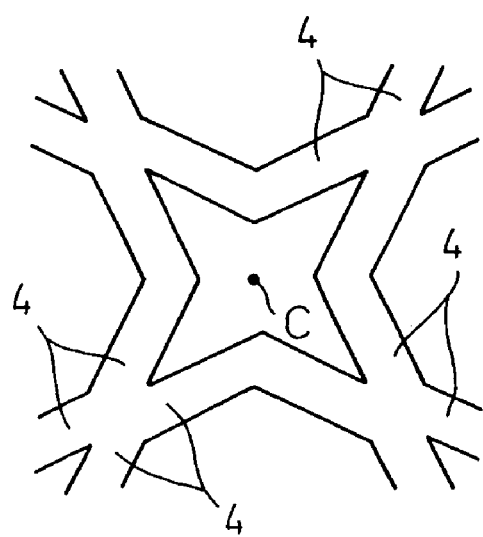
FIG. 6B is a diagram showing the partition walls of the substrate being transformed.

According to this invention, the jig 11 is pressed against the end surface of the pre-mold 10 in such a manner that the protrusions 12 enter passages adjacent to the passages to be closed, i.e. passages other than the passages to be closed. Once the jig 11 begins to be pressed against the end surface of the pre-mold 10, as shown in FIG. 6A, the linearly extending end of each partition wall 4 is transformed by being bent at the central portion thereof toward the center axis C of the passage to be closed, as shown in FIG. 6B. Specifically, the ends of the four partition walls 4 defining each passage to be closed are transformed toward each other so that the forward ends of the partition walls 4 are connected to each other.

The jig 11 further continues to be pressed against the end surface of the pre-mold 10 and, thus, the ends of the partition walls 4 continue to be transformed toward the center axis C of the passage. At the same time, the end surfaces of the partition walls 4 come into contact with the strip-shaped wall surfaces 13 of the jig 11. Thus, the end surfaces of the partition walls 4 are transformed, and are driven into the pre-mold 10 (i.e. the substrate 1) by the wall surface 13. As a result, the end surfaces of the partition walls are transformed into a depression having a deepest portion at the center axis C of the passage. More specifically, according to this invention, the ends of the partition walls 4 are transformed toward the center axis of the passage, while at the same time transforming the end surface of the partition walls 4 into a depression having a deepest portion at the center axis C of the passage. In this way, the openings of predetermined passages are closed by the substantially regular rectangular pyramidal walls 5, 6.

Figure 7A:
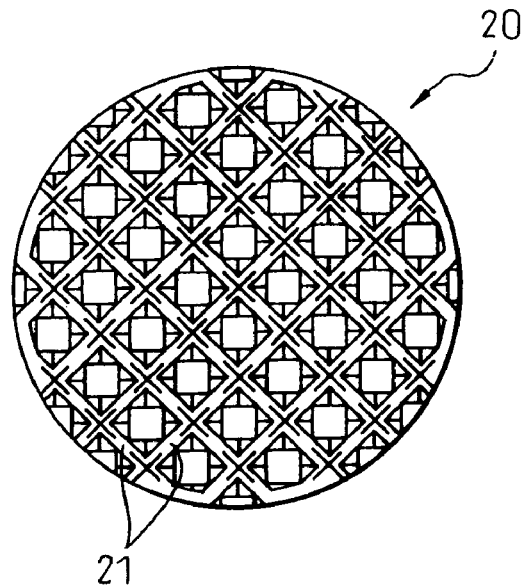
FIG. 7A is a diagram showing an end surface of a substrate as compared with the substrate according to the invention.
Figure 7B:
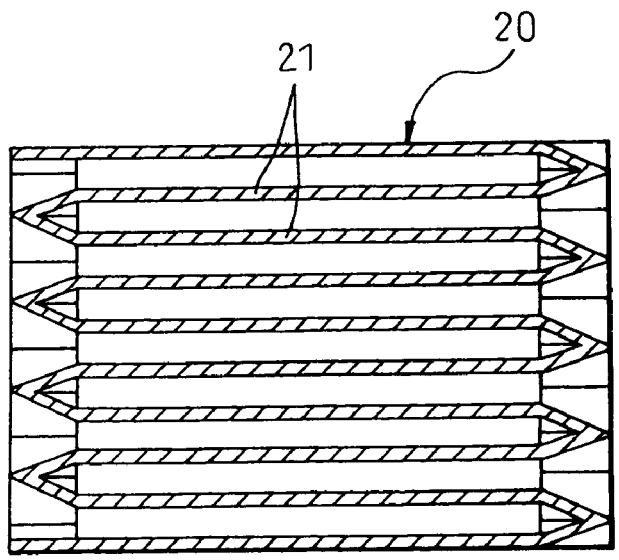
FIG. 7B is a longitudinal sectional view of the substrate shown in FIG. 7A.

According to this invention, as compared with the substrate 20 configured as shown in FIGS. 7A and 7B, the passages can be positively closed up. This fact will be explained. In the substrate shown in FIGS. 7A and 7B, the partition walls 21 defining the passages to be closed are transformed toward the center axis of the corresponding passages while being bent at the central portion thereof. Specifically, the ends of the four partition walls 21 defining a corresponding passage to be closed are transformed toward each other so that the forward ends of the partition walls 21 are connected to each other. In the process, however, the amount by which the forward ends of each partition wall 21 defining the passage to be closed are transformed and are driven into the substrate is substantially equal throughout the forward ends of the partition walls 21, with the result that the forward ends of the partition walls 21 may fail to be sufficiently connected and undesirably form a hole at portions near the center axis of the passage.

According to the invention, in contrast, the amount by which the forward ends of the partition walls 4 defining the passage to be closed are transformed and are driven into the substrate 1 progressively increases toward the center axis C of the passage. As a result, the forward ends of the partition walls 4 are pushed into the substrate 1 to a greater degree, the nearer the center axis C of the passage. Thus, the forward ends of the partition walls 4 are connected sufficiently to each other.

In this invention, as described above, the ends of the partition walls defining each passage to be closed are transformed in such a manner that the particular ends come closer to each other. At the same time, the forward ends of the partition walls are transformed to come still closer to each other and are connected to each other in such a manner that the transformed end surfaces of the partition walls are formed into a depression centered on the center axis of the passage. As an alternative, the ends of the partition walls defining the passage to be closed may be transformed to come closer to each other, followed by transforming the forward ends of the partition walls still closer to each other in such a manner that the end surfaces of the transformed partition walls are formed into a depression centered on the center axis of the passage, thereby connecting the forward ends of the partition walls to each other.

Also, according to the invention, the amount by which the partition wall ends are required to be transformed, to close up the opening of the passage to be closed, can be calculated from the shape (depression in the embodiments described above) of the partition wall ends required to close up the same opening. The partition wall ends thus are transformed by this amount. Specifically, if the step of transforming the partition wall ends closer toward the center axis of the passage is called a first step, and the step of transforming the end surfaces of the transformed partition walls are transformed into a depression centered on the center axis of the passage is called a second step them, in the first step, the partition wall ends are transformed by an amount smaller than the transformation amount calculated above, followed by the second step in which the partition wall ends are transformed by the remainder of the calculated transformation amount by which the same wall ends are left without being transformed in the first step.

The total amount of transformation in the first and second steps may be larger than the calculated transformation amount. In such a case, the partition wall ends are transformed by an amount smaller than the calculated transformation amount in the first step, followed by the second step in which the partition wall ends are further transformed by an amount larger than the remainder of the calculated transformation amount by which the particular partition walls are left without being transformed in the first step. By doing so, the forward ends of the partition walls are transformed and crushed into the same shape.

Figure 8:
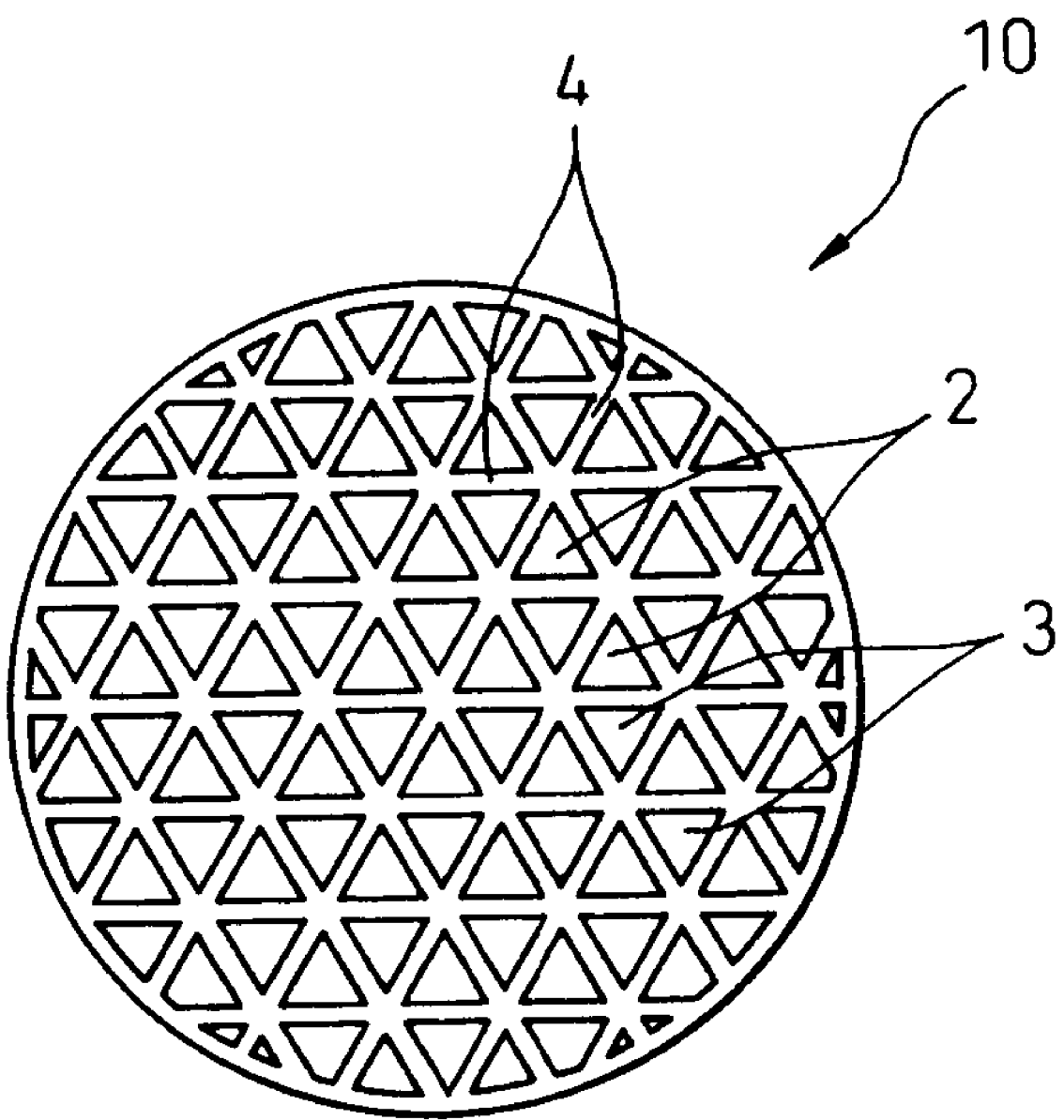
FIG. 8 is a diagram showing an end surface of a pre-mold used in another embodiment.
Figure 9:
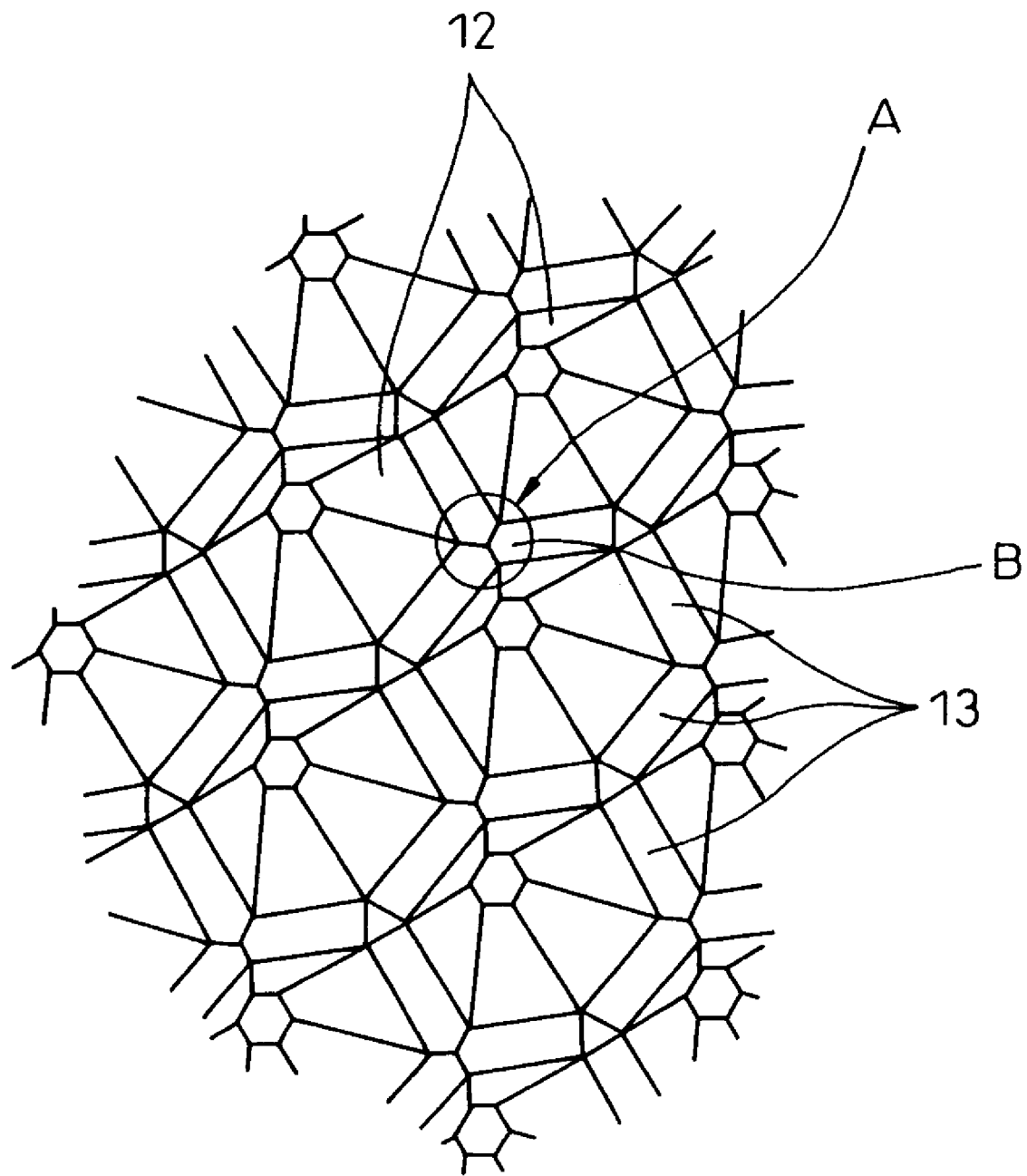
FIG. 9 is a perspective view of a jig used in another embodiment.

The invention is also applicable to an exhaust gas purifying substrate fabricated from a pre-mold 10 having the configuration shown in FIG. 8, and to a method of fabricating such a substrate. Specifically, the pre-mold 10 according to the second embodiment shown in FIG. 8 has a plurality of passages 2, 3 defined by a plurality of partition walls 4 and extending in parallel to each other. The passages 2, 3 have a regular triangular cross section. In fabricating an exhaust gas purifying substrate from the pre-mold 10 shown in FIG. 8, a jig 11, shown in FIG. 9, is used. The jig 11 has a plurality of protrusions 12 substantially in the shape of a truncated regular hexagonal pyramid. The protrusions 12 are arranged in alignment at predetermined spatial intervals. Therefore, a strip-shaped wall surface 13 extends between adjacent protrusions 12. These strip-shaped wall surfaces 13 join each other in an area A where the bottom corners of three adjacent protrusions 12 are concentrated. These strip-shaped wall surfaces 13 are concentrated in such a manner as to be protruded toward the concentrated portion B.

The jig 11 is pressed against the end surface of the pre-mold 10 in such a way that a passage adjoining each passage to be closed, i.e. a passage other than to be closed, is entered by the corresponding protrusion 12. Once the jig 11 begins to be pressed against the end surface of the pre-mold 10, the ends of the partition walls 4 are transformed toward the center axis of the passage by the protrusions 12 while being bent at the central portion thereof. Specifically, the ends of the three partition walls 4 defining each passage are transformed to come closer to each other, so that the forward ends of the partition walls 4 are connected to each other.

The jig 11 then continues to be pressed against the end surface of the pre-mold 10, and thus the ends of the partition walls 4 continue to be transformed toward the center axis of the passage. At the same time, the end surfaces of the partition walls 4 come into contact with the strip-shaped wall surfaces 13 of the jig 11, whereby the end surfaces of the partition walls 4 are transformed and are driven into the pre-mold 10 (i.e. the substrate). In this way, the end surface of each partition wall 4 is transformed into a depression having a deepest portion at the center axis (tip T of a substantially regular hexagonal wall) of the passage. Thus, the openings of predetermined passages are closed up by the substantially regular hexagonal walls.

The matters explained regarding the first embodiment can be applied also to the second embodiment. Also, the ratio of the amount required to transform the partition wall end toward the center axis of a given passage having a regular triangular cross section to close the particular passage relative to the length of one side of each passage, i.e. relative to the width of the partition walls defining the particular passage, is smaller than a similar ratio of the amount required to transform the partition wall end toward the center axis of the passage having a regular triangular cross section to close the same passage relative to the length of one side of each passage. In this case, the breakage of the partition wall ends during the transformation thereof is suppressed. The second embodiment, therefore, as compared with the first embodiment, has the advantage of a smaller chance of the partition wall ends being broken during the transformation thereof.

This invention is of course not limited to an exhaust gas purifying substrate fabricated from a pre-mold configured of passages having a square cross section or a regular triangular cross section and a method of fabrication thereof. Alternatively, the invention is also applicable to an exhaust gas purifying substrate fabricated from a pre-mold configured of passages having a cross section of a polygon such as a rectangle, triangle or hexagon and a method of fabrication thereof. Also in the embodiments described above, the jig having substantially regular square pyramidal protrusions may alternatively have truncated and substantially regular hexagonal protrusions. Further, a jig having truncated and substantially regular hexagonal protrusions may be replaced with a jig having substantially regular hexagonal protrusions with sharp tips.

According to this invention, the forward ends of the partition walls are transformed to come close to each other and connected to each other without fail While the invention has been described by reference to specific embodiments chosen for purposes of illustration, it should be apparent that numerous modifications could be made thereto by those skilled in the art without departing from the basic concept and scope of the invention.

What is claimed is:

1. A method of fabricating a substrate used for purifying the exhaust gas, comprising:
    the step of forming a pre-mold including a first end, a second end, a plurality of partition walls extending between the first end and the second end, and a plurality of passages defined by the plurality of the partition walls;
    the first transforming step for transforming the ends of the partition walls at the first end of the pre-mold defining one of each two adjacent passages in such a manner that the ends of the partition walls are collected toward the center of the corresponding passage and connected to each other; and
    the second transforming step for transforming the ends of the partition walls at the first end of the pre-mold in such a manner that the end surface of each of the partition walls at said first end of said pre-mold is depressed toward the center of the end surface.

2. A method according to claim 1, wherein the first transforming step and the second transforming step are executed at the same time.

3. A method according to claim 1, wherein the second transforming step is executed after the first transforming step.

4. A method according to claim 1, wherein the amount of transformation of the partition wall ends in the first transforming step is smaller than the minimum amount required to close up a corresponding passage with the same partition wall ends, and the amount of transformation of the partition wall ends in the second transforming step is equal to the difference between said minimum required amount and the transformation amount of the partition wall ends in the first transforming step.

5. A method according to claim 1, wherein the amount of transformation of the partition wall ends in the first transforming step is smaller than the minimum amount required to close up a corresponding passage with the same partition wall ends, and the amount of transformation of the partition wall ends in the second transforming step is larger than the difference between said required minimum amount and the transformation amount of the partition wall ends in the first transforming step.

6. A method according to claim 1, wherein the cross section of the passages is a square and the partition wall ends closing the corresponding passages each form a portion in the shape of a substantially regular rectangular pyramid.

7. A method according to claim 1, wherein the cross section of the passages is a regular triangle and the partition wall ends closing the corresponding passages each form a portion in the shape of a substantially regular hexagonal pyramid.

8. A method according to claim 1, wherein the pre-mold is formed of a porous material.

9. A method according to claim 1, further comprising the third transforming step for transforming the partition wall ends at the second end of the pre-mold defining the other of the two adjacent passages in such a manner that the partition wall ends are collected toward the center of the corresponding passage and connected to each other, and the fourth transforming step for transforming the partition wall ends at the second end of the pre-mold in such a manner that the end surfaces of the partition walls at the second end of the pre-mold are depressed toward the center of the end surface.

10. A method according to claim 9, wherein the first transforming step and the second transforming step are executed at the same time, and the third transforming step and the fourth transforming step are executed at the same time.

11. A method according to claim 9, wherein the second transforming step is executed after the first transforming step, and the fourth transforming step is executed after the third transforming step.

12. A method according to claim 9, wherein the amount of transformation of the partition wall ends in the first transforming step is smaller than the minimum amount required to close up the passages with the partition wall ends, the amount of transformation of the partition wall ends in the second transforming step is equal to the difference between the required minimum amount and the transformation amount of the partition wall ends in the first transforming step, the amount of transformation of the partition wall ends in the third transforming step is smaller than the minimum amount required to close up the passages with the partition wall ends, and the amount of transformation of the partition wall ends in the fourth transforming step is equal to the difference between the required minimum amount and the transformation amount of the partition wall ends in the third transforming step.

13. A method according to claim 9, wherein the amount of transformation of the partition wall ends in the first transforming step is smaller than the minimum amount required to close up the passages with the partition wall ends, the amount of transformation of the partition wall ends in the second transforming step is larger than the difference between the required minimum amount and the transformation amount of the partition wall ends in the first transforming step, the amount of transformation of the partition wall ends in the third transforming step is smaller than the minimum amount required to close up the passages with the partition wall ends, and the amount of transformation of the partition wall ends in the fourth transforming step is larger than the difference between the required minimum amount and the transformation amount of the partition wall ends in the third transforming step.

14. A substrate used for purifying the exhaust gas, comprising:
   a first end;
   a second end;
   a plurality of partition walls extending between the first end and the second end; and
   a plurality of passages defined by the plurality of the partition walls;
   wherein the ends of a plurality of the partition walls at the first end of the substrate defining one of each two adjacent passages are collected toward the center of a corresponding passage and connected with each other, the end surface of the partition wall ends at the first end of the substrate being depressed toward the center of the end surface; and
   wherein the ends of a plurality of the partition walls at the second end of the substrate defining the remaining one of the two adjacent passages are collected toward the center of the corresponding passage and connected with each other, the end surface of the partition walls at the second end of the substrate being depressed toward the center of the end surface.

15. A substrate according to claim 14, wherein the cross section of the passages is a square in shape and the partition wall ends closing the corresponding passages form a portion substantially in the shape of a regular rectangular pyramid.

16. A substrate according to claim 14, wherein the cross section of the passages is a regular triangle in shape and the partition wall ends closing the corresponding passages form a portion substantially in the shape of a regular hexagonal pyramid.

17. A substrate according to claim 14, wherein the substrate is formed of a porous material.

* * * * *